United States Patent
Thomas et al.

(12)

(10) Patent No.: US 11,704,623 B1
(45) Date of Patent: *Jul. 18, 2023

(54) SYSTEMS AND METHODS FOR PRODUCT IMAGING AND PROVISIONING APPLICATIONS

(71) Applicant: WALGREEN CO., Deerfield, IL (US)

(72) Inventors: Jai Thomas, Schaumburg, IL (US); Teresa Joy Astreides, Mount Prospect, IL (US); William A. Cuffe, Palatine, IL (US); Lindsay N. Mikos, Arlington Heights, IL (US); Andrew G. Shotwell, Evanston, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,268

(22) Filed: Jun. 24, 2022

Related U.S. Application Data

(63) Continuation of application No. 15/891,823, filed on Feb. 8, 2018, now Pat. No. 11,410,120.

(51) Int. Cl.
*G06Q 30/02* (2023.01)
*G06Q 10/087* (2023.01)
(Continued)

(52) U.S. Cl.
CPC ....... *G06Q 10/087* (2013.01); *G06Q 30/0233* (2013.01); *G06K 7/10722* (2013.01); *G06K 7/1413* (2013.01)

(58) Field of Classification Search
CPC ............. G06Q 10/087; G06Q 30/0233; G06K 7/1413; G06K 7/10722
See application file for complete search history.

(56) References Cited

U.S. PATENT DOCUMENTS

| | | | |
|---|---|---|---|
| 6,974,078 B1 * | 12/2005 | Simon | G06Q 30/06 235/383 |
| 2002/0165787 A1 | 11/2002 | Bates et al. | |

(Continued)

OTHER PUBLICATIONS

"Do you Get Rain Checks? You Should!" (Cassie, published on Nov. 10, 2011 at https://thethriftycouple.com/do-you-get-rain-checks-you-should/) (Year: 2011).*

(Continued)

*Primary Examiner* — James M Detweiler
(74) *Attorney, Agent, or Firm* — Marshall, Gerstein & Borun LLP; Randall G. Rueth

(57) ABSTRACT

Systems and methods for product imaging and provisioning include a mobile application (app) installed on an imaging device, where the mobile app activates the imaging device to generate an image of a product tag associated with an unavailable product at a first location. The mobile app determines, based on the image, a product indicator associated with the unavailable product. A provisioning app, executing on a remote device, receives the product indicator associated with the unavailable product. The provisioning app also receives a user indicator associated with a first user and executes one or more product provisioning rules that determine, based on a product availability database and the user indicator, an availability result. The availability result indicates whether the unavailable product will be available to the first user. The provisioning app is further operable to send the availability result to the imaging device for presentation by the imaging device.

20 Claims, 8 Drawing Sheets

(51) Int. Cl.
  *G06Q 30/0226* (2023.01)
  *G06K 7/10* (2006.01)
  *G06K 7/14* (2006.01)

(56) References Cited

U.S. PATENT DOCUMENTS

| | | | | |
|---|---|---|---|---|
| 2003/0233277 | A1* | 12/2003 | Saunders | G06Q 30/02 |
| | | | | 705/14.24 |
| 2004/0103034 | A1* | 5/2004 | Reade | G06Q 20/20 |
| | | | | 705/16 |
| 2004/0133474 | A1* | 7/2004 | Tami | G06Q 30/02 |
| | | | | 705/16 |
| 2007/0187495 | A1* | 8/2007 | Mullins | G06Q 20/20 |
| | | | | 705/16 |
| 2009/0125411 | A1* | 5/2009 | Otto | G06Q 30/04 |
| | | | | 705/34 |
| 2013/0226661 | A1 | 8/2013 | Barber | |
| 2013/0304559 | A1 | 11/2013 | Stone et al. | |
| 2014/0129305 | A1* | 5/2014 | Frame | G06Q 30/0211 |
| | | | | 705/14.1 |
| 2014/0143039 | A1* | 5/2014 | Branton | G06Q 30/0223 |
| | | | | 705/14.24 |
| 2014/0180785 | A1 | 6/2014 | Argue et al. | |
| 2014/0188663 | A1* | 7/2014 | Cancro | G06Q 30/0623 |
| | | | | 705/26.1 |
| 2014/0207591 | A1* | 7/2014 | Acker, Jr. | G06Q 30/0633 |
| | | | | 705/26.8 |
| 2014/0279291 | A1* | 9/2014 | Brosnan | G06Q 10/087 |
| | | | | 705/28 |
| 2018/0107999 | A1* | 4/2018 | Rizzolo | H04W 4/30 |
| 2018/0260772 | A1* | 9/2018 | Chaubard | G06T 7/0008 |

OTHER PUBLICATIONS

Cassie, "Do you Get Rain Checks? You Should!" Retrieved from Internet at: <https://thethirftycouple.com/do-you-get-rain-checks-you-should/> (2011).

* cited by examiner

US 11,704,623 B1

SYSTEMS AND METHODS FOR PRODUCT IMAGING AND PROVISIONING APPLICATIONS

CROSS REFERENCE TO RELATED APPLICATIONS

This application claims the benefit of U.S. application Ser. No. 15/891,823 (filed on Feb. 8, 2018), which is incorporated by reference in its entirety herein.

FIELD OF THE DISCLOSURE

The present disclosure generally relates to systems and methods for product imaging and provisioning, and, more particularly, to a mobile application (app) and a provisioning app configured to image and provision products that are unavailable to users at particular onsite locations.

BACKGROUND

Typical onsite consumer locations, such as retail locations, generally stock a finite product inventory. In order to turn the product inventory over more quickly, a consumer location, or related company, may promote a product or product(s) via sales or other promotions that may include discounts, credits, or other consumer incentives. Such sales and promotions, while useful to increase inventory turnover, also typically create increased demand, and, as a consequence, a supply shortage of the promoted products. For example, a retail location may experience users that are unable to purchase a desired product because the product is out of stock, or otherwise unavailable, at the particular retail location. Such users typically seek management, or other store personnel at the retail location, to inquire about the availability of the unavailable product, and, may also request to receive a current promotion or incentive (e.g., a current sale price) at a future time when the product becomes restocked.

Typical practices of facilitating such customer requests requires store personnel (typically a manager) at the retail location to issue physical, hand-written, paper slips that allow the customer to purchase the product at the future time and at the current sale price. However, implementation of the hand-written practice can create problems, for example: by typically requiring store personnel (e.g., the store manager) to provide a detailed hand-written description on a paper slip of the product, which may include sale price (all while the user waits); creating consumer management issues, where the paper slip may be easily lost or misplaced by the user (potentially causing a lost, future sale for the store); creating a communication issue, where the user may have no indication of when the product will be available (if at all); and, creating additional labor issues, where the store is required to expend additional employee hours and, therefore, experience increased labor costs from store personnel practicing the typical paper implemented practice. Accordingly, there is a need for systems and methods for product imaging and provisioning that alleviates these issues.

BRIEF SUMMARY

The embodiments of the present disclosure are directed to systems and methods for product imaging and provisioning, which provide onsite users with a fast, self-serviced, and secure platform for managing unavailable products themselves. The systems and methods of the present disclosure replaces the traditional manually written, manager approved, paper slips typically used at onsite retail locations.

Accordingly, in various embodiments provided herein, systems and methods for product imaging and provisioning are described where a mobile application (app) installed on an imaging device is operable to activate the imaging device to generate an image of a product tag associated with an unavailable product. In several embodiments, the unavailable product may be currently unavailable at a first location. The mobile app may also be operable to determine, based on the image, a product indicator associated with the unavailable product. An unavailable product may be, for example, a product that is currently out of stock at a particular location.

A provisioning app, executing on a remote device, may be operable to receive requests from, and send responses to, the mobile app, where the provisioning app receives the product indicator associated with the unavailable product. The provisioning app may be further operable to receive a user indicator associated with a first user, and to execute one or more product provisioning rules. For example, in various embodiments, the one or more product provisioning rules may determine, based on a product availability database and the user indicator, an availability result that indicates whether the unavailable product will be available to the first user. In some embodiments, for example, the one or more product provisioning rules may include a maximum limit product rule that specifies a maximum amount of the unavailable product that will be available to all users. In other embodiments, the one or more product provisioning rules may include a per-user limit product rule that specifies an amount of the unavailable product that will be available to the first user. In still further embodiments, the one or more product provisioning rules may include a second location rule that is triggered when the unavailable product is unavailable at the first location, but is available at a second location. In such embodiments, the second location rule may cause the availability result to indicate that the unavailable product is available to the first user at the second location.

The provisioning app may be further operable to send the availability result to the imaging device for presentation via the imaging device. In some embodiments, receipt of the availability result may cause the imaging device, via the mobile app, to display an indication that the unavailable product has been associated with the user indicator and to further display the predefined purchase amount. In still further embodiments, the mobile app may be further operable to display a list of one or more availability results.

In some embodiments, the availability result may indicate that the unavailable product will be available to the first user, for example, at the first location. In such embodiments, the provisioning app may associate the product indicator with the user indicator, for example, by associating the product indicator with the user indicator in the user's profile or account on the provisioning platform. In further embodiments, a predefined purchase amount of the unavailable product may be associated with the user indicator so that the user can purchase the unavailable product at the predefined purchase amount when the unavailable product becomes available. In some embodiments, the user may select to purchase the unavailable product with balance reward points associated with the user indicator, for example, as associated with a user profile or account that includes the user indicator.

In various embodiments, the availability result may further include an expiration timestamp that indicates when the predefined purchase amount will be disassociated with the user indicator. When the predefined purchase amount is disassociated with the user indicator, for example, the user may not be able to purchase the unavailable product at the predefined purchase amount. In some embodiments, the expiration timestamp may be set to a date one week from the determination of the availability result. In other embodiments, the expiration timestamp may be set to a date of expiration of the unavailable product. In still further embodiments, the expiration timestamp may be based on the first location, for example, where the expiration timestamp is determined on a per-location basis.

In several embodiments, the provisioning app may be further operable to notify the first user via a notification when the unavailable product becomes available. In some embodiments, the notification may be a push-based notification (e.g., such as a text message, an email, or an electronic voice message notification). For example, the text message may be a native or built-in text message, for example a native or built-in text message received through the native platform of a user's mobile device, such as via iOS for an Apple iPhone mobile device.

Various benefits arise from the systems and methods for product imaging and provisioning as described herein. For example, the consumer location may increase sales to users that may otherwise have been lost to user not purchasing a product that was otherwise unavailable. In addition, provisioning a product to a user is enhanced where, for example, the user is able, via the mobile and provisioning apps, to facilitate, on his or her own, provisioning the product, at the current sale price (or other price, including a regular price), and for an unavailable product. This can increase user satisfaction because the user no longer has to wait on store personnel (e.g., a manger) to produce a manual, handwritten paper slip. For the same reasons, the store is able to decrease or depend on fewer labor hours, especially in periods when several sales or other product promotions are ongoing. Other benefits may also be realized by the store, including decreasing potential wait time for other customers, and decreasing fraud and abuse of the system by facilitating and tracking operations via the mobile and provisioning apps. In addition to the store-based benefits, the imaging and providing systems and methods, as describe herein, may allow a company, or otherwise entity, to generate and build a data rich (or "big data") environment to track consumer behavior or otherwise generate or determine useful statistics or consumer patterns, that may be used for future sales events or other business-to-consumer (B2C) transactions, management, etc.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1:
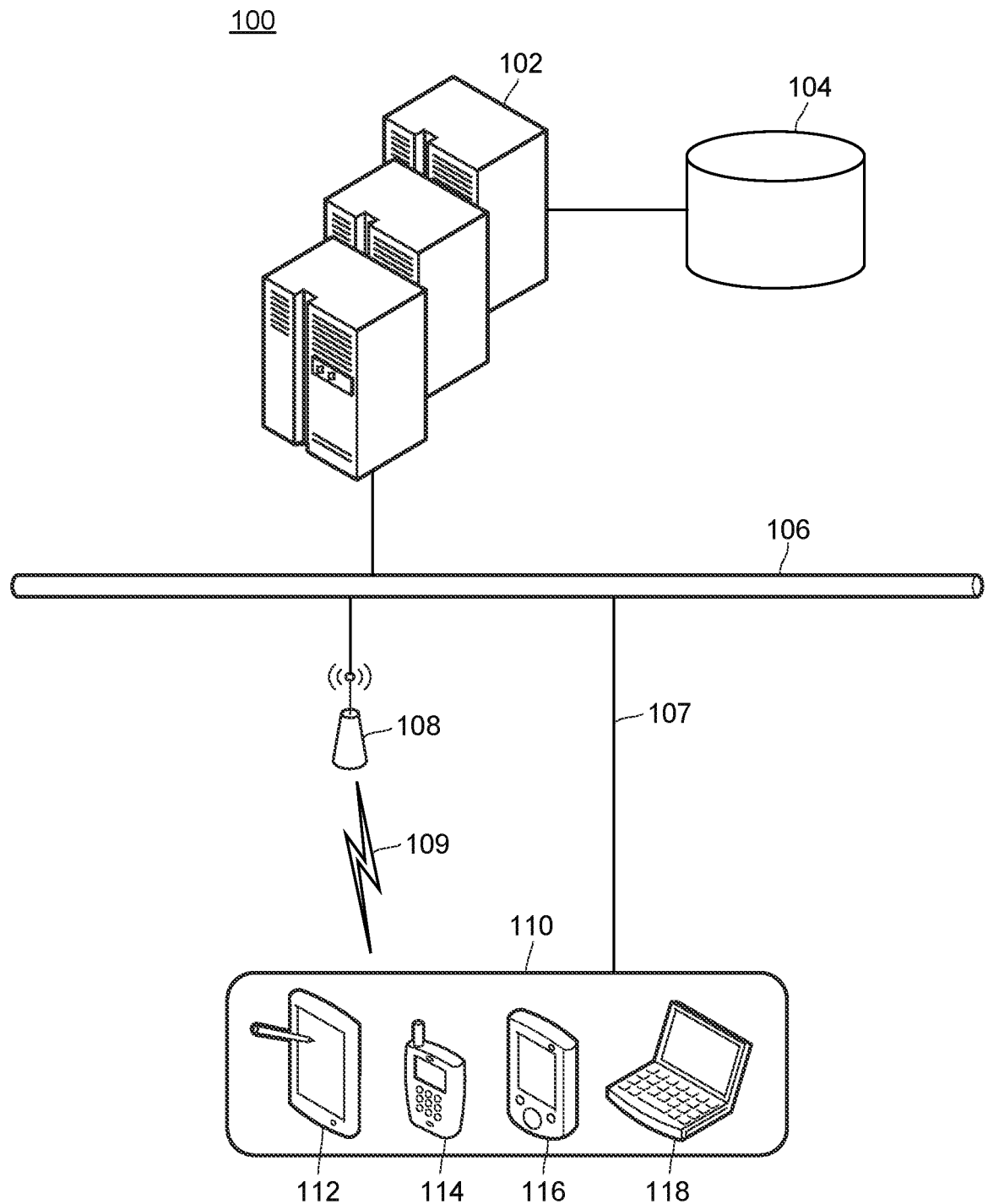
FIG. 1 illustrates an example network diagram in accordance with various embodiments of the present disclosure.

FIG. 1 illustrates an example network diagram 100 in accordance with various embodiments of the present disclosure. Network diagram 100 includes several online, electronic devices for facilitating the systems and methods for product imaging and provisioning described herein. For example, one or more remote server(s) 102 are communicatively coupled to computer network 106. The remote server(s) 102 may be back-end servers, which may be hosted in a redundant fashion, for receiving electronic requests and for providing electronic responses across computer network 106. The remote server(s) 102 may include one or more processors, memories, and/or network interfaces, and may implement one or more client-server based platforms (including, for example, any of Microsoft .NET, Java J2EE, Ruby on Rails, Node.js., etc.) for facilitating the responses and requests across computer network 106. The remote server(s) 102 may also include, or be remotely connected (via a local or remote computer network) to, a product availability database 104. The product availability database 104 may include data and other information regarding a company's product inventory or related user information. Such information may include various products, product indicators (e.g., barcodes or other unique identifiers that uniquely identify the company's products), various prices for the products, user profile or account information for association with products, timestamps for the expiration dates of such products, the company's retail locations, product inventory information (e.g., amounts and types) at those locations, the company's warehouse locations, product inventory information (e.g., amounts and types) at those warehouse locations, future purchases of various products by the company from third-party suppliers or wholesalers, and timestamps for availability of such products at any of the retail locations, warehouse locations, or other locations that the company expects to keep or track product inventory.

The remote server(s) 102 may implement a provisioning app, stored thereon, that has access to the product availability database 104. The provisioning app may, for example, be implemented in a native programming language of the remote server(s) 102 client-server based platform, including, for example, C#, Java, Ruby, or JavaScript. In other embodiments, the provisioning app may be written in a non-native language or may be implemented as a cloud-based service or a Representational State Transfer (RESTful) application programming interface (API), where the remote server(s) 102 access or implement the provisioning app via the RESTful API. The provisioning app may also have access to one or more user profiles, where each user may be identified by a user indicator. A user profile may store information about a given user, including, for example, the user's personal information (e.g., name, address, etc.), the user's contact information (e.g., email and phone number), the user's transaction history, the user's balance reward points (e.g., gained from past user transactions, and that the user may apply to future transactions), and other information about the user. The user profile may also include, or be associated with, one or more saved products, e.g., products that the user has clipped or saved to his or her profile because such product was physically unavailable a particular location. As described herein, the user that has saved or clipped a product is said to have received a "rain check" for the unavailable product, where the user may have the opportunity to purchase the saved product at a later time, but for the current (possibly on-sale) product.

As further described herein, the provisioning app of remote server(s) 102 may also implement one or more product provisioning rules. The product provisioning rules may be implemented in a native or non-native language with respect to the client-server platform implemented by the remote server(s) 102. The product provisioning rules may access the product availability database 104 to determine, or generate, one or more availability results. For example, based on an incoming request to clip or save an unavailable product to a user's profile, the remote server(s) 102 may activate one or more product provisioning rules to determine whether such product may be saved or clipped to the user's profile for future purchase by the user. As further described herein, in some embodiments, the product provisioning rules may prevent or allow product provisioning requests, for example, the product provisioning rules may limit the number of products provisioned (e.g., allowing only 100 products to be provisioned across all users), or may limit the number of products provisioned per customer (e.g., allowing a customer to provision up to three products only). In other embodiments, the product provisioning rules may identify that a product that is unavailable at a first location and is instead available at a second location, where the provisioning app may cause the remote server(s) 102 to notify the user of the availability at the second location.

The provisioning app may also be configured to implement push-based notifications. For example, the provisioning app on remote server(s) 102, may execute one or more batch processes, scheduled processes, or other tracking or timed processes to determine whether any saved or clipped products in user profiles are available (or will be soon available) at a location accessible to the corresponding users. Upon such identification availability, the provisioning app, e.g., via the network interface of remote server(s) 102, may send a push-based notification (e.g., a text message, email, automated voice message, etc.) to the user to inform the user of the availability of the product at the particular location.

As depicted in FIG. 1, computer network 106 may be a packet-based network, such as the Internet, that implements various computer communication protocols, including Ethernet, TCP/IP, etc. The remote server(s) 102 may communicate with one or more mobile device(s) 110 that may be associated with various users, e.g., those users having user profiles at remote server(s) 102.

The mobile device(s) 110 may include, for example, a tablet device 112, cellular phone 114, smartphone 116, or laptop 118. The mobile device(s) 110 may each include one or more processors, one or more memories, and one or more network interfaces (wired and wireless) for communicating across computer network 106. The mobile device(s) 110 may each implement a mobile platform or operating system such as Apple iOS, Google Android, or Microsoft Windows, and may implement a mobile app configured to communicate with the provisioning app of remote server(s) 102. The mobile device(s) 110 may communicate with server(s) 102 via computer network 106 over any of a wired connection 107 or a wireless connection 108. The wired connection may include, for example, one or more Ethernet cables connected to laptop 118. The wireless connection 108 may include, for example, an electronic signal 109 based on one or more wireless communication standards which may be any of the WiFi standard (e.g., IEEE 802.11), the Bluetooth standard, or any of the cellular or mobile phone standards (e.g., LTE, GSM, UMTS, etc.). Each of the mobile devices 110 may include imaging hardware (e.g., one or more camera(s), sensor(s), etc.), such that the mobile devices may be used as imaging devices for identifying unavailable products at particular locations. In some embodiments, a mobile device 110 may be a mobile device of the user, such as a smartphone (e.g., smartphone 116) or other mobile device 110 owned by the user. In other embodiments, the mobile device 110 may be a mobile device operated by store personnel (for example, in the instance where a user does not have a mobile device).

Figure 2:
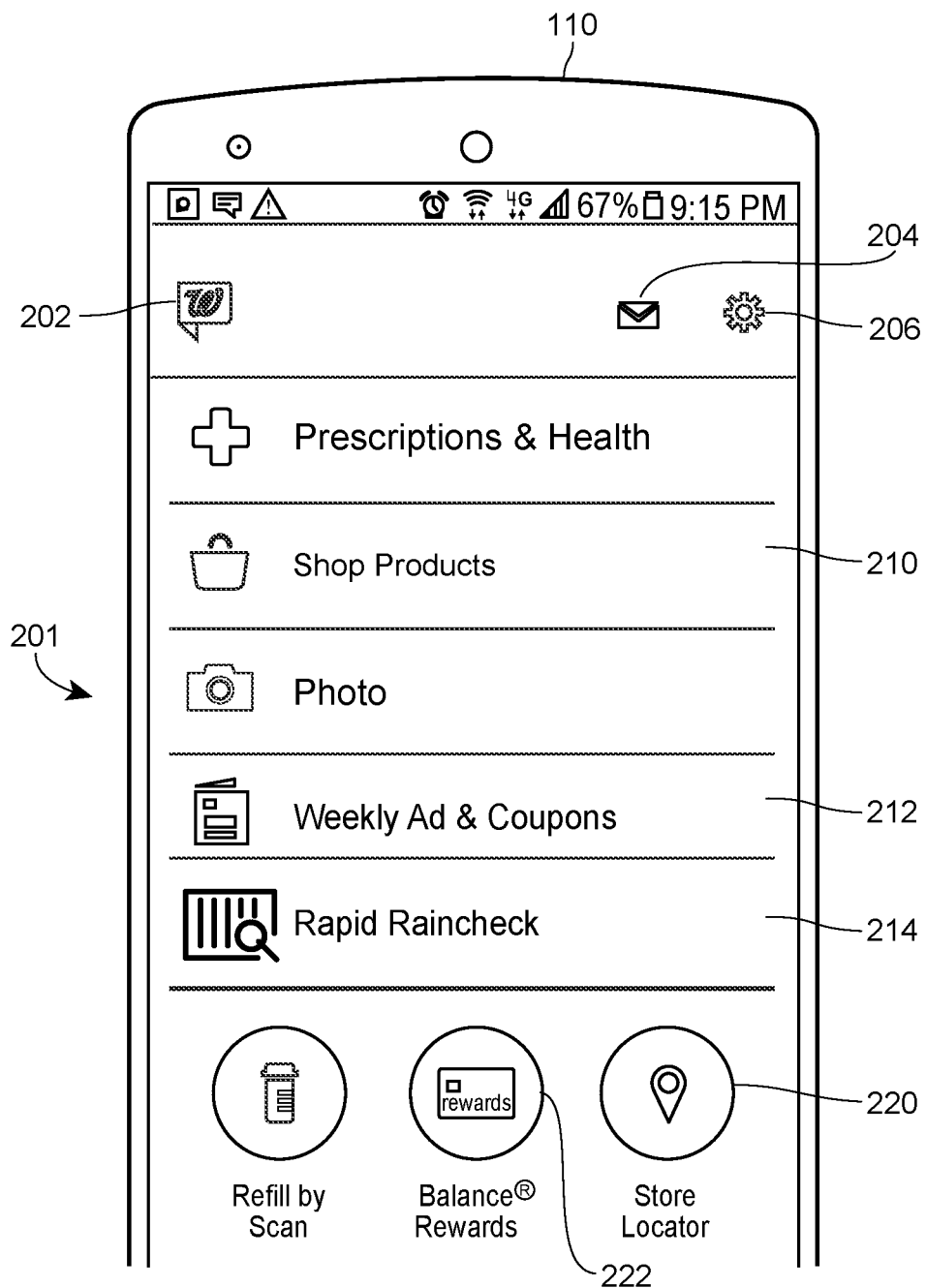
FIG. 2 illustrates an embodiment of a mobile device of FIG. 1 implementing an embodiment of a mobile app depicting an example main menu view.

FIG. 2 illustrates an embodiment of a mobile device 110 of FIG. 1 implementing an embodiment of a mobile app 201 depicting an example main menu view 202. The mobile app 201 may be implemented on various mobile platforms as described herein, for example, the Apple iOS platform or the Google Android platform. Launching mobile app 201 may default to the main menu view 202. The main menu view 202 may include a title bar, mail icon 204, settings icon 206. The mail icon 204 may be selected, for example, to launch a mailing or notification view, such as notification view 702 of FIG. 7 as described herein. The settings icon 206 may be used to change, update, or otherwise view the user's settings, user profile, or other user related information as described herein.

The main menu view 202 may also include several selectable menu options 210-214. For example, the shop products option 210 may launch a shopping view (not shown) that displays available products for purchase. In some embodiments, for example, the shop products option 210 may cause the mobile app 201 to request product information from the remote server(s) 102, where the provisioning app may access a list of available products and respond to the mobile device 110. The mobile device 110 may then display the products via the mobile app 201. Selection of a particular product may cause the mobile app 201 to display a product information view, such as the example product information view 402 of FIG. 4 as described herein.

Figure 6:
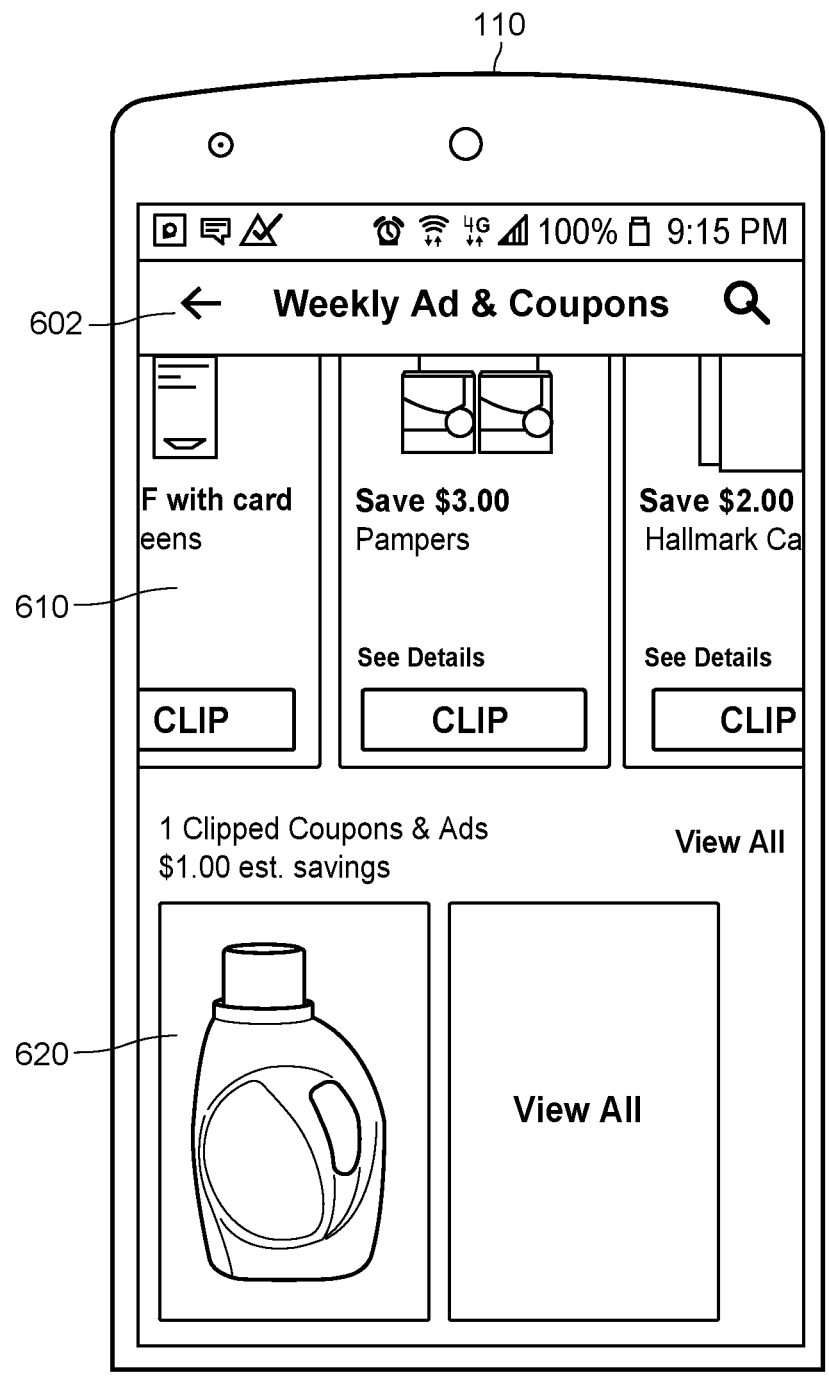
FIG. 6 illustrates an embodiment of the mobile device and mobile app of FIG. 2 depicting an example list view.

The main menu view 202 may also include a weekly ad and coupon option 212 that may cause the mobile app 201 to launch a list view, such as list view 602 as shown and described for FIG. 6 herein. The main menu view 202 may also include a product provisioning option 214 that may launch a barcode imaging view, such as barcode imaging view 302 of FIG. 3 as described herein. In the embodiment shown in FIG. 2, the product provisioning option 214 may be associated with a product provisioning platform, described herein as the "Rapid Raincheck" platform, and as displayed as part of main menu view 202 in FIG. 2.

The main menu view 202 may further include a store locator option 220 and a balance rewards option 222. Selection of the store locator option 220 may cause the mobile app 201 to launch a store locator view (not shown), where, in one embodiment the user may be presented with a map that includes geographic locations of stores that are available in a user's vicinity. In another embodiment, the store locator option 220 may cause an additional view to request geographic information, such as zip code information, from the user, where upon receiving the geographic information the store locator view may display a list of locations of stores in the provided zip code.

Selection of the balance rewards option 222 may cause the mobile app 201 to display a balance rewards view (not shown), which may include information regarding the user's balance rewards profile, such as how many balance reward points the user has available. As described herein, balance reward points may be used to purchase products and/or services from the company or store providing a balance reward program to its users.

Figure 3:
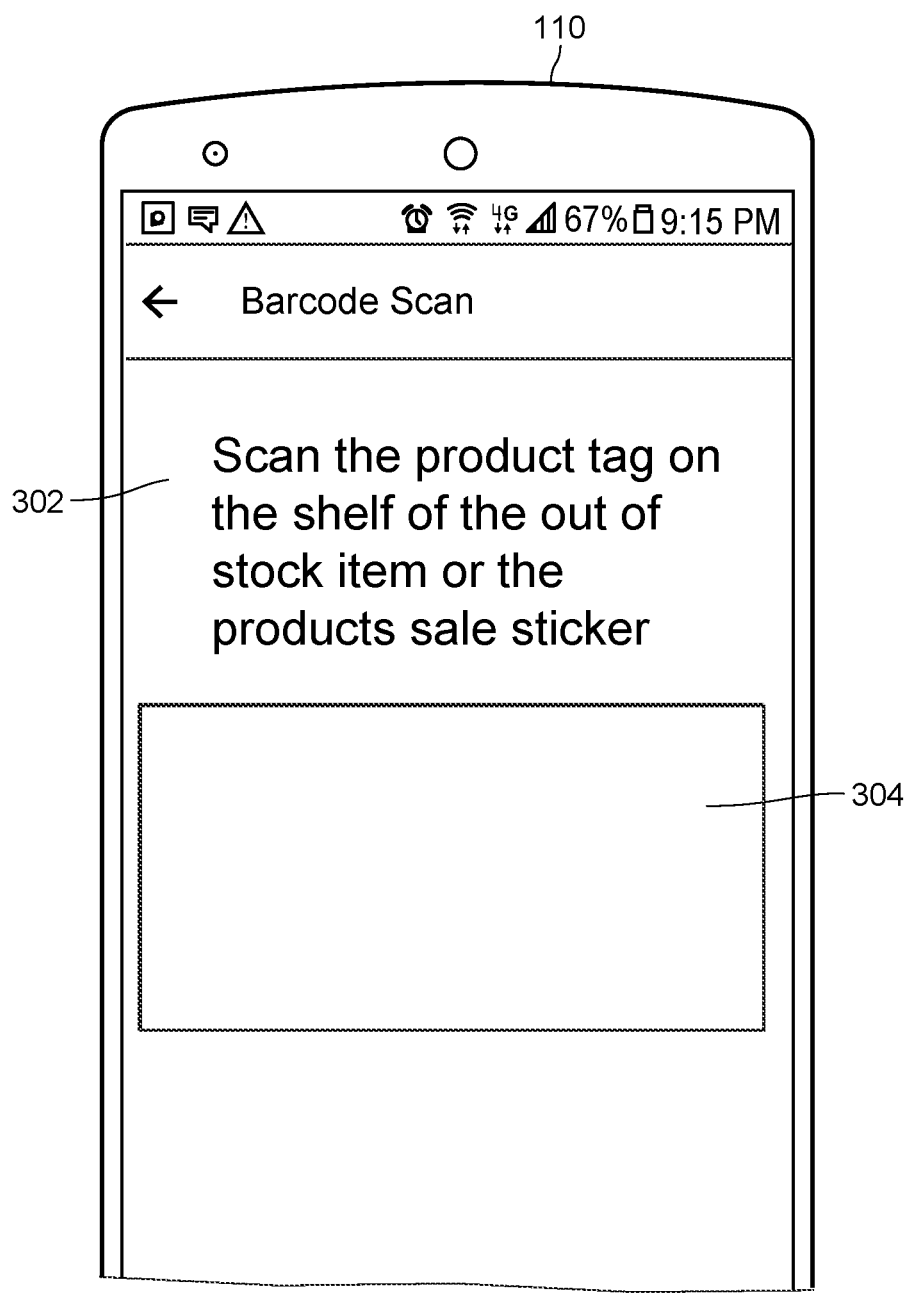
FIG. 3 illustrates an embodiment of the mobile device and mobile app of FIG. 2 depicting an example barcode imaging view.

FIG. 3 illustrates an embodiment of the mobile device 110 and mobile app 201 of FIG. 2 depicting an example barcode imaging view 302. Barcode imaging view 302 may be launched from the main menu view 202 or the product information view 402 as described herein for FIG. 4. Launching the barcode imaging view 302 activates the mobile device's 110 imaging features, which may include one or more cameras, sensors, flash lighting, etc. In this manner, the mobile device 110 acts an imaging device to image product tags and derive product indicators as further described herein. For example, the barcode imaging view 302 includes an imaging area 304, that the user may use to image or scan product tags of products at store locations. For example, in various embodiments disclosed herein, the user may be present a particular store location that has a sale on a currently unavailable product (in other embodiments, the unavailable product may not be on sale). The unavailable product may typically occupy a particular area of the store, such as a shelving unit, or other consumer accessible location. The shelving unit, or other consumer accessible location, may include a product tag that includes information about the unavailable product, where such information may include a current price (e.g., a sale price or a regular price) of the unavailable product, a product indicator for the unavailable product (that uniquely identifies the unavailable product), an image of the unavailable product, or other such product information of the unavailable product. The user, using the imaging device with imaging area 304, may hold the imaging device to the product tag to generate an image of the product tag associated with the unavailable product. The image may be stored, for example, in the one or more memories of the imaging device/mobile device 110. The imaging device/mobile device 110 may then extract information from the generated image, such information including, for example, the price, product indicator, etc. associated with the unavailable product.

Figure 4:
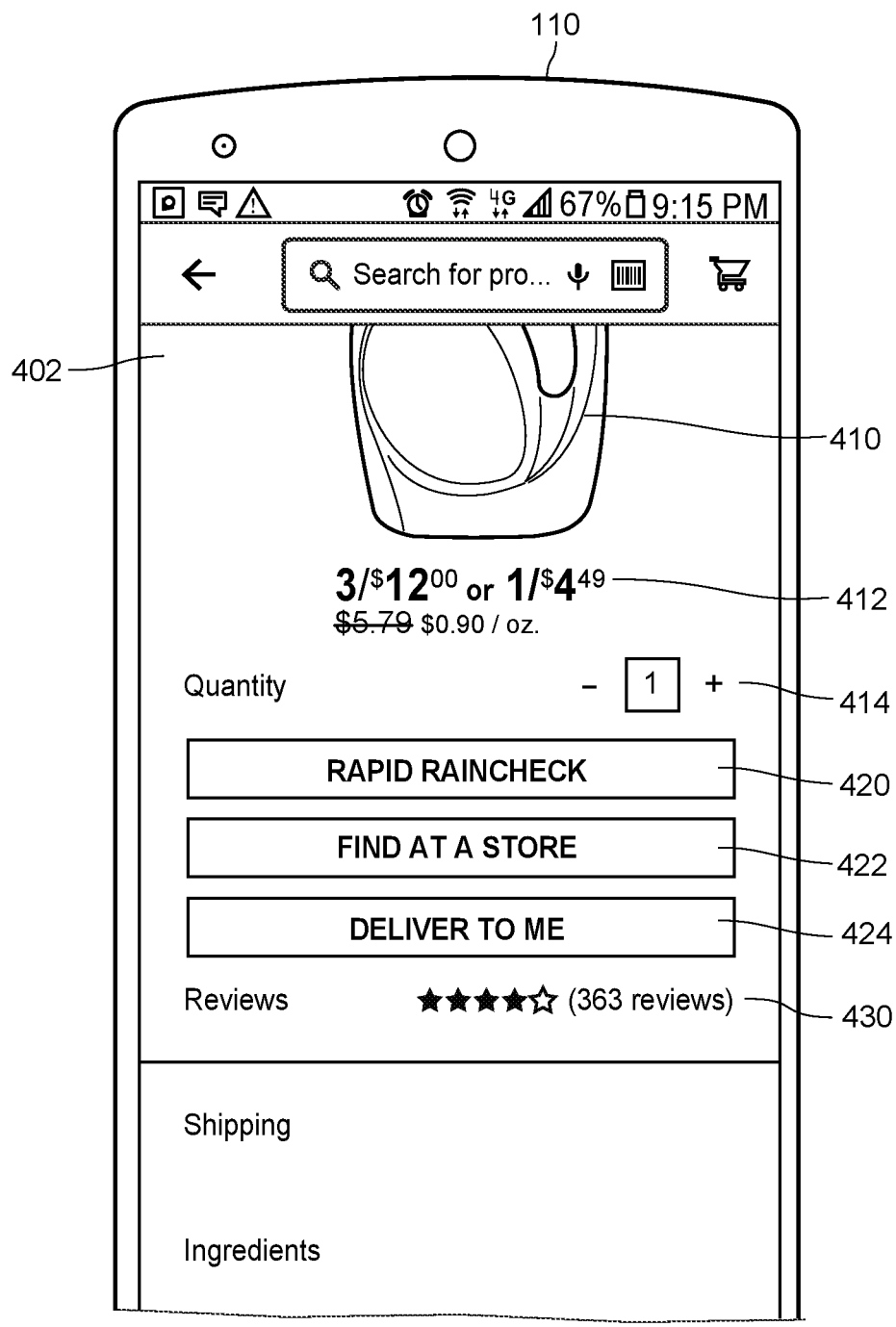
FIG. 4 illustrates an embodiment of the mobile device and mobile app of FIG. 2 depicting an example detailed product information view.

FIG. 4 illustrates an embodiment of the mobile device 110 and mobile app 201 of FIG. 2 depicting an example detailed product information view 402. Product information view 402 may be launched from the main menu view 202 as described herein for FIG. 2. The product information view 402 may include various information about a particular product offered by a company or store. The product information displayed by the product information view 402 may be accessed or derived, for example, from the remote server(s) 102 and/or product availability database 104 of FIG. 1. For example, upon selecting or imaging a particular product using the mobile app 201, the imaging device/mobile device 110 may request product information from the remote server(s) 102 and/or product availability data base 104, and the remote server(s) may return the product information for display via product information view 402. For example, product information view 402 includes a product image 410 depicting a selected or imaged product, in this example, a "Tide Sport" laundry detergent product. The product information view 402 further includes price information 412, including the normal price "$5.79," and sale price information including "3/$12.00 or 1/$4.49." The product information view 402 further includes a quantity selector 414, where a user may select a quantity of products for purchase (e.g., showing a quantity of "1" selected for purchase in FIG. 4). In some embodiments, the product information view 402 may further indicate a total number of products available at the store location (not shown).

Figure 5:
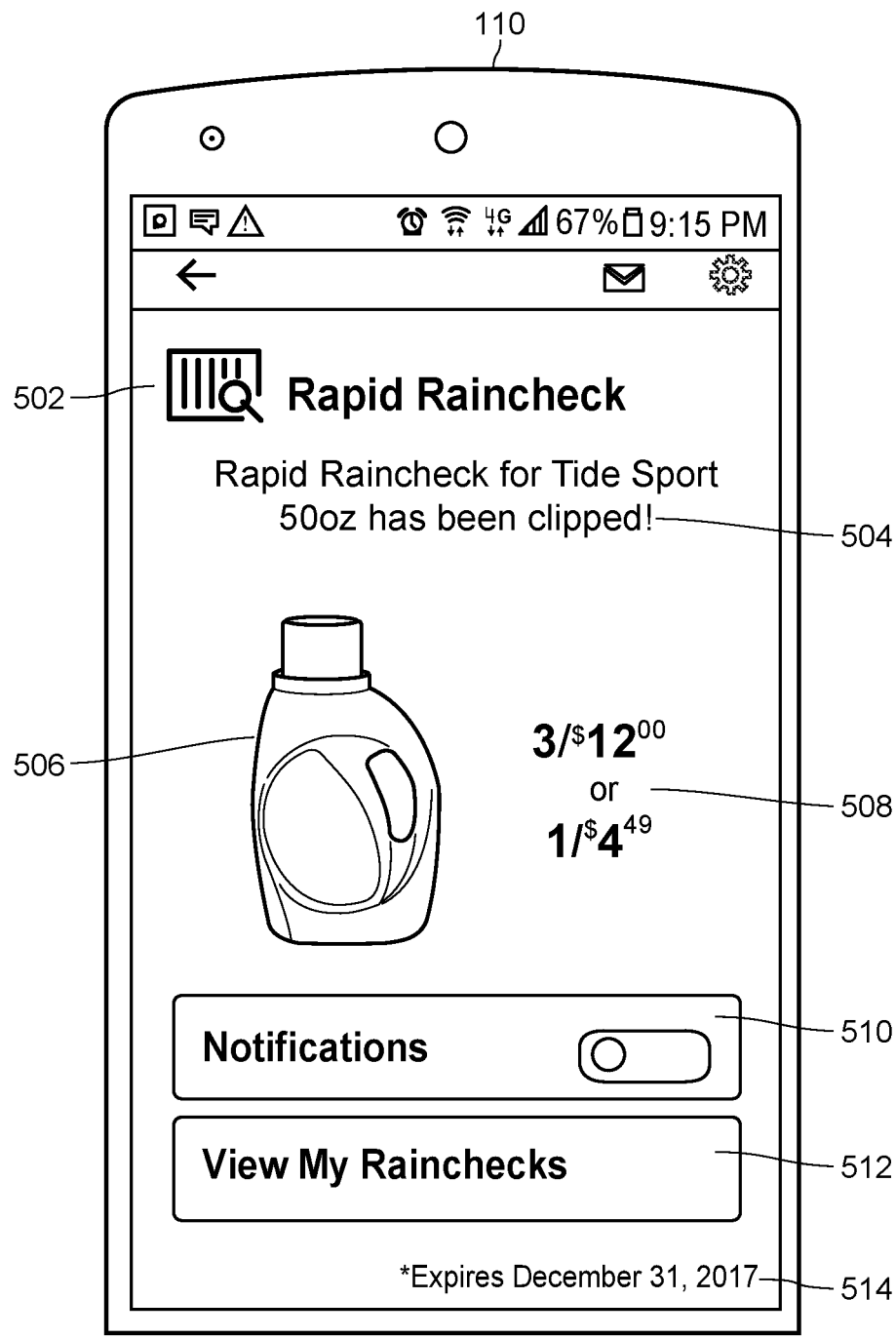
FIG. 5 illustrates an embodiment of the mobile device and mobile app of FIG. 2 depicting an example product provisioning view.

The product information view 402 may further include a product provisioning option 420 that may launch a product provisioning view 502 of FIG. 5 as described herein. The product information view 402 may further include a find option 422, which may provide information about a nearby store or location that has the product available, or, in other embodiments, may provide information about where the product is located in a particular store, at a particular location, on a particular shelving unit located within a store, etc. The product information view 402 may further include a delivery option 424 where, the product may be delivered to the user. The product information view 402 may further include a product rating 430, which can provide information about the number of reviews and a rating (e.g., an average rating) for the product.

FIG. 5 illustrates an embodiment of the mobile device 110 and mobile app 201 of FIG. 2 depicting an example product provisioning view 502. The product provisioning view 502, also described as a "Rapid Raincheck" view of the embodiment of FIG. 5, may include a confirmation message 504 that the user has successfully saved (e.g., "clipped") the product to his or her user profile or account, which may, for example, be stored at the remote server(s) 102 of FIG. 1. For example, as shown for FIG. 5, the user may receive a message that, e.g., "Rapid Raincheck for Tide Sport 50 oz has been clipped!" The product information view 402 may further include a product image 506 depicting a selected or imaged product, for example, the product "Tide Sport," as described for FIG. 4. The product information view 402 may further include price information 508, for example, the price information as described for FIG. 4. The product information view 402 further includes a notification option 510. Notification option 510 may be toggled by the user, where one toggled setting indicates that the user wants to be notified when a saved (or clipped) product (e.g., a product that is currently unavailable) at the store becomes available at a particular location or store (or at another nearby location or store). Another toggled setting may indicate that the user does not want to be notified when the product becomes available.

In some embodiments, where the user toggles or selects to be notified, the notification may be facilitated via a push-based notification, for example, such as a text, an email, or a phone/voice-based notification that may be initiated when the product becomes available. In such embodiments, the remote server(s) 102 may be programmed to identify when the unavailable products are available at the particular location (or at another location or store), for example, by executing a batch program that accesses and identifies available products from the product availability database 104, and matches that products against saved or clipped products in one or more user's profiles or accounts.

In some embodiments, the product provisioning view 502 may further include a view option 512, where a user may select the view option 512 in order to display a list view of saved or clipped products on mobile device 110, such as the list view described for the embodiment of FIG. 6.

In other embodiments, the product provisioning view 502 may include a timestamp (e.g., timestamp 514) indicating a date/time that the offer for the saved or clipped product expires. For example, the product provisioning view 502 may indicate that the offer (e.g., the sale price) for the saved or clipped product expiries within a week's time from the notification. In other embodiments, the product provisioning view 502 may indicate that the offer (e.g., the sale price) for the saved or clipped product is the same as the date of expiration of the unavailable product, for example, for such products that have expirations dates, including, medicine, food, beverages, etc. In still further embodiments, the product provisioning view 502 may indicate that the offer (e.g., the sale price) for the saved or clipped product is for a product at a different, or second location, from the location where the user first saved or clipped an unavailable product.

FIG. 6 illustrates an embodiment of the mobile device 110 and mobile app 201 of FIG. 2 depicting an example list view 602. List view 602 may be accessed, for example, via the weekly ad and coupon option 212 as described for FIG. 2 and/or view option 512 as described for FIG. 5. List view 602 may include various product listings, adds, clippings, coupons, etc. For example, in one embodiment, list view 602 may include list 610 that includes weekly ads/coupons that show available ads and/or coupon deals or offers that the user may choose to save or clip to his or her profile or account. Such saved or clipped coupons or offers may be saved on the one or more memories of the mobile device 110 and/or the one or more memories of remote server(s) 102.

List view 602 may also include a saved product view 620 that indicates, or lists, some or all of the products that the user has saved or clipped to his or her user profile or account. For example, as shown in FIG. 6, the saved product view 620 shows that the user has saved or clipped the "Tide Sport" offer as described for FIGS. 4 and 5. In some embodiments, in order to save or clip the "Tide Sport" product offer, the user may have scanned a product tag associated with the "Tide Sport" product as described in the embodiments for FIG. 3, e.g., where the "Tide Sport" product may have been unavailable at a location that the user was visiting. In other embodiments, in order to save or clip the "Tide Sport" product offer, the user may have identified the product via the mobile app 201 and selected the product provisioning option 420 as described for the embodiments of FIG. 4. In either embodiment, the offer or sale of the "Tide Sport" product may be associated with the user's profile or account with the store or location owner or company, and the user may request to purchase the product using the saved offer by providing the user's indicator (that uniquely identifies the user to the product provisioning platform as described herein), or, in other embodiments, by providing the user's other information (e.g., phone number), which may also uniquely identify the user to the product provisioning platform.

Figure 7:
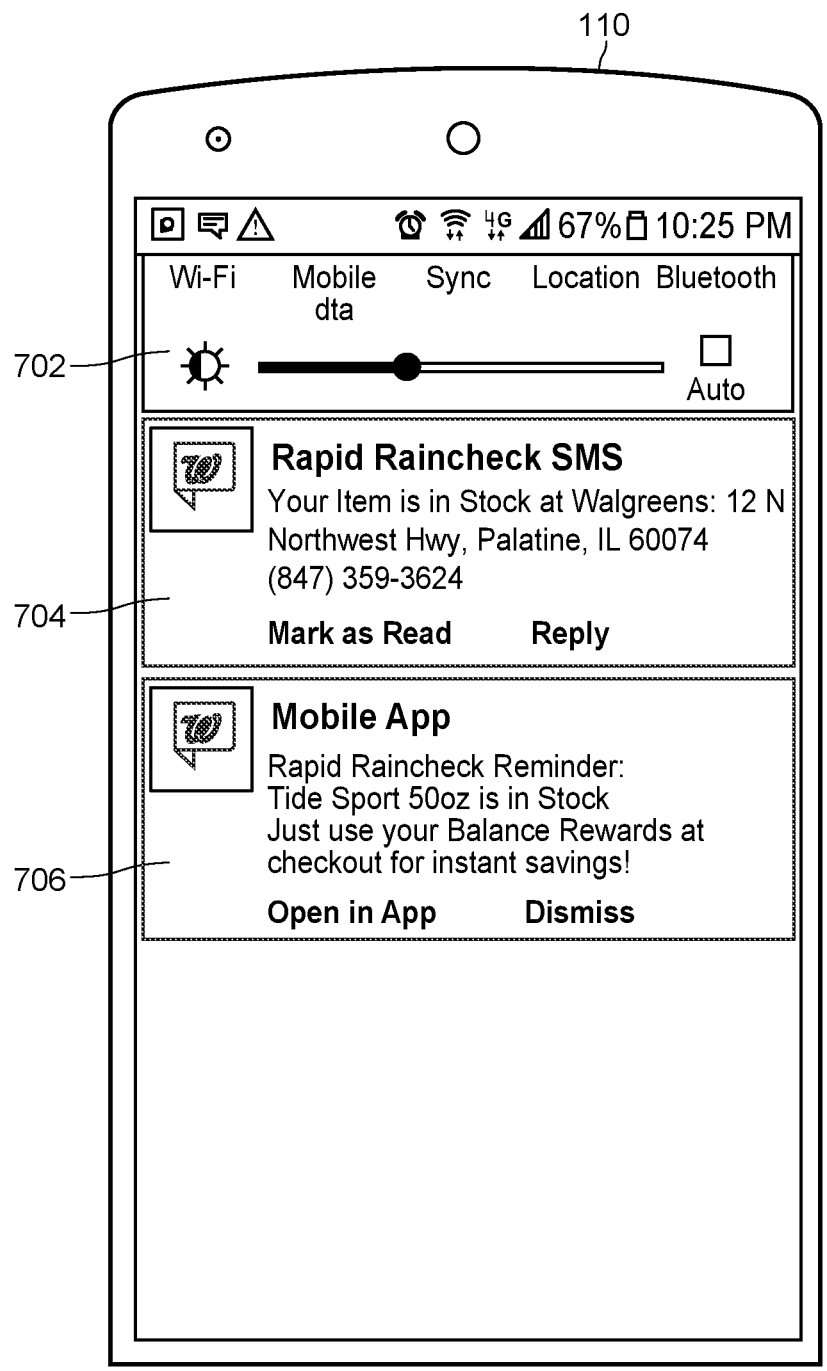
FIG. 7 illustrates an embodiment of the mobile device and mobile app of FIG. 2 depicting an example notification view.

FIG. 7 illustrates an embodiment of the mobile device 110 and mobile app 201 of FIG. 2 depicting an example notification view 702. Notification view 702 may include multiple types of notifications, where such notifications may be communicated via multiple channels or sources. For example, in one embodiment, notification view 702 may include a push-based notification, such as text-based notification 704 where the mobile device 110 is sent a text message (SMS) message from the remote server(s) 102 indicating that a previously unavailable product that the user had saved or clipped has become available ("in stock") at a particular location, e.g., "12 N. Northwest Hwy, Palatine, Ill. 60074," in the current embodiment.

In other embodiments, notification view 702 may include a further pushed-based notification, for example, an in-app based notification 706 where the mobile device 110 receives the notification 706 via the mobile app 201. For example, in such embodiments the mobile app 201 may include a communication or "mail" section (e.g., accessible via mail icon 204 as shown in FIG. 2), where the user can receive and send mail-based messages within the mobile app 201. For example, as shown, the user may receive in-app based notification 706 that informs the user of a "Rapid Raincheck" reminder (i.e., a provisioning reminder), which indicates that the "Tide Sport" product is in stock at the location that the user saved or clipped the "Tide Sport" product offer. The user may choose to open the offer in the mobile app 201 as shown in notification 706.

Figure 8:
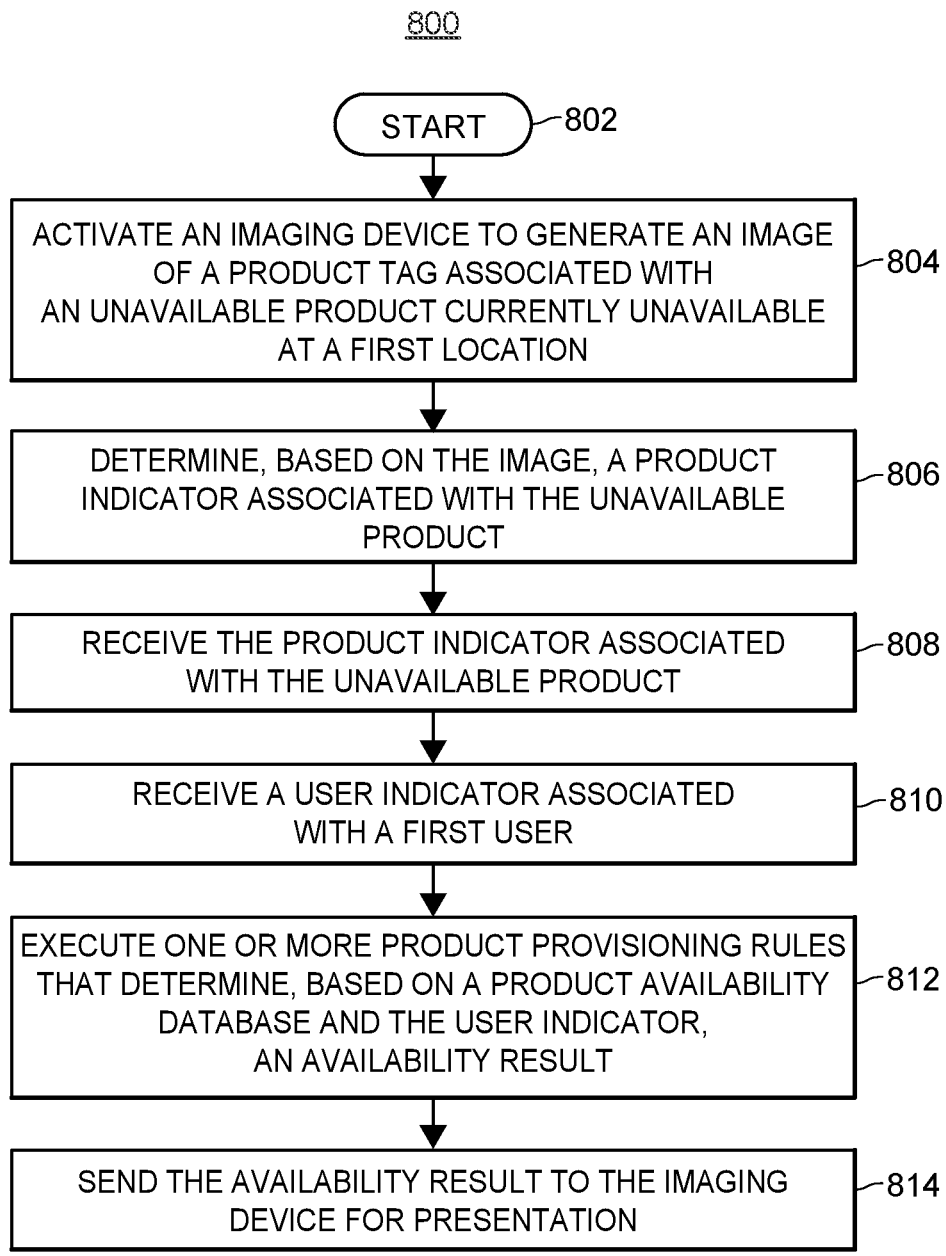
FIG. 8 illustrates a flow diagram of an example product imaging and provisioning method.

FIG. 8 illustrates a flow diagram of an example product imaging and provisioning method 800. Method 800 may begin (block 802) where a mobile app (e.g., mobile app 201) installed on an imaging device (e.g., a mobile device 110), at block 804, activates the imaging device to generate an image of a product tag associated with an unavailable product (e.g., the "Tide Sport" product as described herein). The mobile device 110 may be a smart phone of the user. In other embodiments, mobile device 110 may be an imaging or mobile device of the store or location that may be used by store personnel, for example, to image or scan the unavailable product tag on behalf of the user (and, in some embodiments, to associate the product indicator of the unavailable product with the user's indicator, as further described herein). In several embodiments, the unavailable product may be currently unavailable at a first location, for example, a location that a user is currently visiting. At block 806, the mobile app 201 may determine, based on the image, a product indicator, such as product identifier or other unique product indicator, associated with the unavailable product. The product indicator may be recognized, stored, or otherwise associated with information of the product availability database 104 described for FIG. 1.

At block 808, a provisioning app executing on a remote device (e.g., remote server(s) 102 of FIG. 1), may be operable to receive requests from, and send responses to, the mobile app, for example, the mobile app 201 installed on a mobile device 110. The provisioning app may receive the product indicator associated with the unavailable product. At block 810, the provisioning app may also receive a user indicator associated with a first user, for example, a first user who imaged or scanned an unavailable product tag at the first location.

At block 812, the provisioning app executes one or more product provisioning rules to determine an availability result that indicates whether the unavailable product will be available to the first user. In some embodiments, the availability result may be generated as a data structure, or data format, for transmission over a computer network, such as network 106 of FIG. 1. The data structure, or data format, may be, for example, implemented in the JavaScript Object Notation (JSON), extensible Markup Language (XML), or via some other data structure or format for holding product availability results or information determined by the product provisioning rules.

The determination of the availability result may be based on a product availability database and the user indicator. For example, a product availability database (e.g., such as product availability database 104 of FIG. 1) may store product related information, such as the amount of inventory of the product at various locations (e.g., different stores or warehouses), the expected dates/times of when an unavailable product is to become available at certain stores or locations, whether an unavailable product is a seasonal product (e.g., an Easter-themed product, a Christmas-themed product, a Halloween-themed product, etc.), meta-information such as how many products a user is allowed to save or clip, or how many products for a particular product, may be saved or clipped by all users. The provisioning app may access the product related information in the product availability database 104, and, together with the user indicator, be used to determine whether the unavailable product will be available to the first user. For example, in one embodiment, a maximum limit product rule may cause the provisioning app to access the product availability database 104 to restrict a maximum amount of the unavailable product that will be available to all users. In another embodiment, a per-user limit product rule may cause the provisioning app to access the product availability database 104 to restrict an amount of the unavailable product that will be available to the first user. In yet a further embodiment, a second location rule may cause the provisioning app to access the product availability database 104 and trigger, when the unavailable product is unavailable at the first location, a determination that the unavailable product is available at a second location. In such embodiments, the second location rule may cause the availability result to indicate that the unavailable product is available to the first user at the second location. In still a further embodiment, a prior product rule may cause the provisioning app to send notifications to a first user when a particular product goes on sale, where the first user had previously scanned (or, in some embodiments, purchased) the particular product in the past. In a further embodiment, an item expiration rule may cause the provisioning app to send multiple notifications to the first user regarding a product with an expiration date, and where the first user had previously scanned the product with the expiration date. In such an embodiment, the provisioning app may send multiple notifications to the first user that update the user that the expiration date of the product is approaching, has past, etc.

At block 814, the provisioning app may send the availability result to the imaging device for presentation via the imaging device. In various embodiments, the imaging device may be a mobile device 110 (as described for FIG. 1), where the imaging device/mobile device 110, via mobile app 201, receives the data structure or data format of the availability result and displays the information therein via the mobile device 110. In some embodiments, receipt of the availability result may cause the imaging device/mobile device 110, via the mobile app 201, to display an indication that the unavailable product has been associated with the user indicator and to further display the predefined purchase amount. For example, the imaging device/mobile device 110, via the mobile app 201, may display the product provisioning view 502 of FIG. 5 as described herein, as the indication that the unavailable product has been associated with the user indicator (which may also include the predefined purchase amount). In still further embodiments, the mobile app 201 may be further operable to display a list of one or more availability results. For example, the imaging device/mobile device 110, via the mobile app 201 may display the list view 602 of FIG. 6 as described herein, as the list of one or more availability results (e.g., as saved product view 620 that indicates, or lists, some or all of the products that the user has saved or clipped to his or her user profile or account).

In some embodiments, the availability result may indicate that the unavailable product will be available to the first user, for example, at the first location. In such embodiments, the provisioning app may associate the product indicator with the user indicator, for example, by associating the product indicator with the user indicator in the user's profile or account on the provisioning platform, including such as with the remote server(s) 102 and/or the product availability database 104. In further embodiments, a predefined purchase amount of the unavailable product may be associated with the user indicator so that the user can purchase the unavailable product at the predefined purchase amount when the unavailable product becomes available. In some embodiments, the user may select to purchase the unavailable product with balance reward points associated with the user indicator, for example, as associated with a user profile or account that includes the user indicator, and that may also store the user's balance reward points. Such information may be accessed or stored on the remote server(s) and/or the product availability database 104.

In still further embodiments, the availability result may indicate that the unavailable product will not be available to the first user. Such embodiments may include products that have been discontinued (at least temporarily), for example, such as seasonal products (e.g., Easter-themed products, Christmas-themed, Halloween-themed products, etc.).

In various embodiments, the availability result may further include an expiration timestamp (such as the timestamp 514 of FIG. 5 as descried herein) that indicates when the predefined purchase amount will be disassociated with the user indicator. When the predefined purchase amount is disassociated with the user indicator, for example, the user may not be able to purchase the unavailable product at the predefined purchase amount. In some embodiments, the expiration timestamp may be set to a date one week from the determination of the availability result. In other embodiments, the expiration timestamp may be set to a date of expiration of the unavailable product (e.g., for products such as food or medicine that typically include expiration dates). In still further embodiments, the expiration timestamp may be based on the first location, for example, where the expiration timestamp is determined on a per-location basis. For example, a first location may have a typical one week expiration timestamp, but a second location may have a different, two week expiration timestamp. Other expiration bases for the per-location timestamp may be also used as contemplated herein.

In several embodiments, the provisioning app may be further operable to notify the first user via a notification when the unavailable product becomes available. In some embodiments, the mobile app 201 may include an in-app mail service to notify the user when the unavailable product becomes available. For example, an in-app based notification 706, as described herein for FIG. 7, may be used to notify the user when the unavailable product becomes available. In other embodiments, the notification may be a push-based notification (e.g., such as a text message, an email, or an electronic voice message notification). For example, text-based notification 704 shows an example of an SMS (text) based message, as described for FIG. 7 herein.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A product provisioning system comprising:
   a remote device comprising one or more processors;
   a mobile application (app) installed on an imaging device, the mobile app operable to:
   activate the imaging device to generate an image of a product tag associated with an unavailable product, the unavailable product currently unavailable at a first location, and
   determine, based on the image, a product indicator associated with the unavailable product; and
   extract a price from the image of the product tag at a given time;
   a provisioning app executing on the remote device, the provisioning app operable to receive requests from, and send responses to, the mobile app, the provisioning app further operable to:
   receive the product indicator associated with the unavailable product,
   receive a user indicator associated with a first user,
   execute one or more product provisioning rules, the one or more product provisioning rules determining, based on a product availability database and the user indicator, an availability result, the availability result indicating whether the unavailable product will be available to the first user,
   send the availability result to the imaging device, wherein the availability result and price of the unavailable product as imaged in the product tag at the given time is presented via the imaging device on a display view, receive a request from the imaging device indicating a selection of the first user to save the price of the unavailable product as imaged in the product tag at the given time, and associate the price of the unavailable product as imaged in the product tag at the given time with the user indicator of the first user.

2. The product provisioning system of claim 1, wherein the availability result indicates that the unavailable product will be available to the first user, and wherein the provisioning app associates the product indicator with the user indicator.

3. The product provisioning system of claim 2, wherein a predefined purchase amount of the unavailable product is associated with the user indicator.

4. The product provisioning system of claim 3, wherein the availability result further indicates an expiration timestamp, the expiration timestamp indicating when the predefined purchase amount will be disassociated with the user indicator.

5. The product provisioning system of claim 3, wherein the provisioning app is further operable to receive a selection of the first user to purchase the unavailable product with balance reward points associated with the user indicator.

6. The product provisioning system of claim 4, wherein the expiration timestamp is set to a date one week from the determination of the availability result.

7. The product provisioning system of claim 4, wherein the expiration timestamp is set to a date of expiration of the unavailable product.

8. The product provisioning system of claim 4, wherein the expiration timestamp is set based on the first location.

9. The product provisioning system of claim 3, wherein availability result causes the imaging device to display an indication that the unavailable product has been associated with the user indicator and to display the predefined purchase amount.

10. The product provisioning system of claim 2, wherein the provisioning app is further operable to notify the first user via a notification when the unavailable product becomes available.

11. The product provisioning system of claim 10, wherein the notification is a push-based notification.

12. The product provisioning system of claim 2, wherein the mobile app is further operable to display a list of one or more availability results.

13. The product providing system of claim 1, wherein the one or more product provisioning rules include a maximum limit product rule, the maximum limit product rule specifying the a maximum amount of the unavailable product that will be available to all users.

14. The product providing system of claim 1, wherein the one or more product provisioning rules include a per-user limit product rule, the per-user limit product rule specifying the an amount of the unavailable product that will be available to the first user.

15. The product providing system of claim 1, wherein the one or more product provisioning rules include a second location rule, the second location rule triggered when the unavailable product is unavailable at the first location and is available at a second location, the second location rule causing the availability result to indicate that the unavailable product is available to the first user at the second location.

16. A product provisioning method comprising:

activating, via a mobile application (app), an imaging device to generate an image of a product tag associated with an unavailable product, the unavailable product currently unavailable at a first location;

determining, based on the image, a product indicator associated with the unavailable product;

extracting a price from the image of the product tag at a given time;

receiving, via a provisioning app executing on a remote device, the product indicator associated with the unavailable product;

receiving, via the provisioning app, a user indicator associated with a first user;

executing, via the provisioning app, one or more product provisioning rules, the one or more product provisioning rules determining, based on a product availability database and the user indicator, an availability result, the availability result indicating whether the unavailable product will be available to the first user;

sending, via the provisioning app, the availability result to the imaging device, wherein the availability result and price of the unavailable product as imaged in the product tag at the given time is presented via the imaging device on a display view;

receiving a request from the imaging device indicating a selection of the first user to save the price of the unavailable product as imaged in the product tag at the given time; and associating the price of the unavailable product as imaged in the product tag at the given time with the user indicator of the first user.

17. The product provisioning method of claim 16, wherein the availability result indicates that the unavailable product will be available to the first user, and wherein the provisioning app associates the product indicator with the user indicator.

18. The product provisioning method of claim 17, wherein the mobile app displays a list of one or more availability results.

19. The product provisioning method of claim 17, wherein a predefined purchase amount of the unavailable product is associated with the user indicator.

20. The product provisioning method of claim 17, wherein the provisioning app notifies the first user via a notification when the unavailable product becomes available.

\* \* \* \* \*